(12) United States Patent
Brandl

(10) Patent No.: US 8,591,626 B2
(45) Date of Patent: Nov. 26, 2013

(54) METHOD AND APPARATUS FOR SEPARATION OF GAS MIXTURES

(75) Inventor: Alexander Brandl, Munich (DE)

(73) Assignee: Linde Aktiengesellschaft, Munich (DE)

( * ) Notice: Subject to any disclaimer, the term of this patent is extended or adjusted under 35 U.S.C. 154(b) by 176 days.

(21) Appl. No.: 13/288,314

(22) Filed: Nov. 3, 2011

(65) Prior Publication Data

US 2012/0111195 A1    May 10, 2012

(30) Foreign Application Priority Data

Nov. 4, 2010  (DE) .......................... 10 2010 050 435

(51) Int. Cl.
  *B01D 53/14* (2006.01)
(52) U.S. Cl.
  USPC ........ 95/19; 96/253; 96/263; 95/199; 95/223; 95/236
(58) Field of Classification Search
  USPC ................. 95/236, 223, 92; 96/234; 423/220, 423/226–228, 230
  See application file for complete search history.

(56) References Cited

U.S. PATENT DOCUMENTS

| | | | | |
|---|---|---|---|---|
| 4,324,567 A | * | 4/1982 | Ranke et al. | 95/161 |
| 4,780,115 A | * | 10/1988 | Ranke | 95/176 |
| 2009/0241773 A1 | * | 10/2009 | Lechnick et al. | 95/44 |
| 2009/0241778 A1 | * | 10/2009 | Lechnick et al. | 95/177 |

* cited by examiner

*Primary Examiner* — Duane Smith
*Assistant Examiner* — Cabrena Hall
(74) *Attorney, Agent, or Firm* — Millen, White, Zelano & Branigan, P.C.

(57) ABSTRACT

The invention relates to a method as well as a device for separation of a carbon-dioxide-containing gas mixture (1), whereby carbon dioxide is separated from the carbon-dioxide-containing gas mixture (1) by physical gas washing (W1) and is converted into two product streams (3, 4) that consist primarily of carbon dioxide and have different pressures, and in the event of an operational breakdown, after their pressures are balanced, the product streams are subjected to an after-treatment step (W2) and then are released into the atmosphere. For balancing the pressures of the two carbon dioxide product streams (3, 4), the carbon dioxide stream (3, 7) that has the lower pressure is compressed by a gas jet ventilator (G), whereby the carbon dioxide stream (4) that has the higher pressure is used as a pumping medium (6).

17 Claims, 1 Drawing Sheet

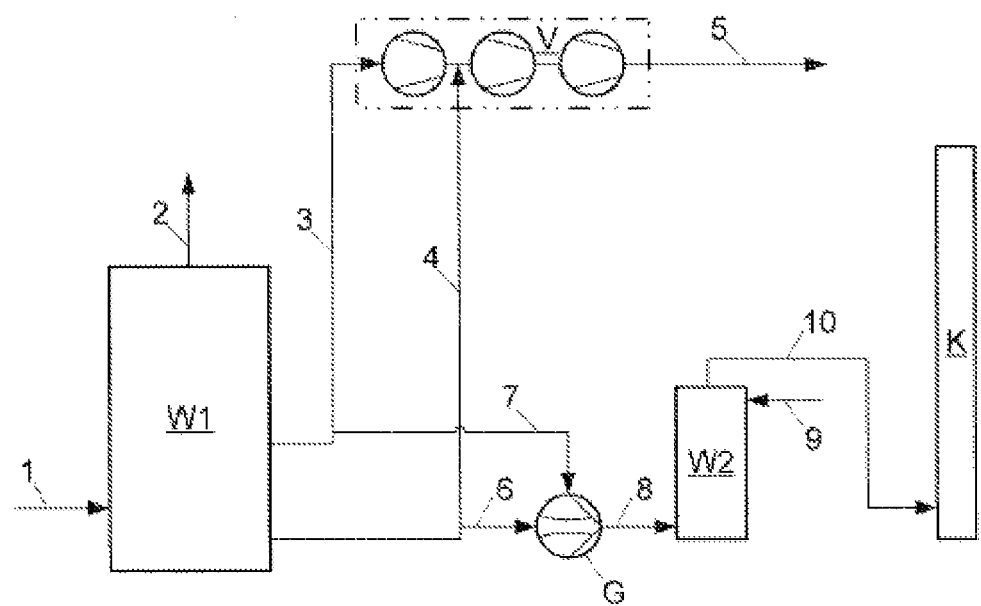

METHOD AND APPARATUS FOR SEPARATION OF GAS MIXTURES

SUMMARY OF THE INVENTION

The invention relates to a method for separation of a gas mixture that contains carbon dioxide, whereby carbon dioxide is separated from the carbon dioxide-containing gas mixture by physical gas washing and is converted into two product streams that contain primarily carbon dioxide and have different pressures, and in the event of an operational breakdown, after their pressures are balanced, the product streams are subjected to an after-treatment step and then are released into the atmosphere. In addition, the invention also relates to a device for implementing the above-described method.

Nowadays, hydrogen and carbon monoxide are produced on the industrial scale primarily by the gassification of carbon-containing feedstocks. In this case, a gas mixture that is referred to as synthesis gas is produced as an intermediate product, which in addition to the desirable substances hydrogen and/or carbon monoxide, also has, i.a., considerable amounts of undesirable carbon dioxide. To separate the carbon dioxide, the synthesis gas in most cases is separated by physical gas washing or gas scrubbing, whereby it is washed with a scrubbing agent that has a physical action, such as, for example, methanol (see, for example, U.S. Pat. No. 4,938,783). Examples of other scrubbing agents are ethanol, acetone, N-methylpyrrolydone, dimethylformamide, propylene carbonate, propylene glycol dialkyl ethers, and mixtures thereof.

The separated carbon dioxide is either disposed of by release into the atmosphere or is delivered as a carbon dioxide product to a consumer. Since carbon dioxide in the atmosphere is very harmful to the environment, concepts for long-term storage (sequestration) are now being examined intensively, whereby the carbon-dioxide product that is separated from the synthesis gas is forced into, for example, underground reservoirs.

Depending on the method, the carbon dioxide that is obtained from the physical gas scrubbing stage contains scrubbing agent residues. If their concentration lies above a boundary value that is specified by the use of carbon dioxide, an after-treatment step, in which the concentration of the scrubbing agent residue is reduced, is necessary. Usually, stricter boundary values are to be maintained when the carbon dioxide is to be released directly into the atmosphere than when it is delivered as a gas product. If the carbon dioxide that is produced from the physical gas scrubbing stage is delivered as a product to a consumer, or fed to sequestration, an after-treatment state can often be eliminated during normal operation, since the boundary value is maintained for the scrubbing agent concentration. In these cases, however, in the event of an operational breakdown owing to which the carbon dioxide cannot be passed on as a product, an after-treatment step is often necessary to be able to adhere to the applicable boundary value for the release of carbon dioxide into the atmosphere.

With synthesis gas separation, it is often advantageous to produce two carbon dioxide products with different pressure levels and to release the latter at the plant boundaries. If it is necessary in the event of an operational breakdown, the carbon dioxide stream that has the higher pressure is depressurized to the pressure level of the second carbon dioxide stream and subjected together with the latter to an after-treatment. The systems that are used for the after-treatment step must be designed for the carbon dioxide volume stream that will develop. If the physical gas scrubbing stage is a methanol scrubber, the after-treatment step normally comprises a water scrubbing, in which excess methanol is scrubbed out in an absorber column using demineralized water. The absorber column gives rise to a considerable part of the investment costs of the gas separator, particularly since it is made from high-grade steel because of the strongly corrosive action of water-saturated carbon dioxide, and typically has a diameter of approximately 7 m with a height of approximately 15 m because of the low operating pressure in industrial-scale plants.

It is therefore an object of this invention to provide a method of the above-described type, as well as an apparatus for its implementation, by which it is possible to be able to separate a carbon dioxide product from a gas mixture at lower cost than that which is possible according to the state of the art.

Upon further study of the specification and appended claims, other objects and advantages of the invention will become apparent.

On the method side, these objects are achieved according to the invention in that, for balancing the pressures of the two carbon dioxide product streams, the carbon dioxide product stream that has the lower pressure is compressed by means of a gas jet ventilator, whereby the carbon dioxide product stream that has the higher pressure is used as a pumping medium.

A merged carbon dioxide stream, whose pressure level is elevated compared to the state of the art, is produced by the compression according to the invention. The system that is necessary for the after-treatment step can therefore be made more economical with a smaller structural volume.

For many years, gas jet ventilators have been state of the art and are known to one skilled in the art. They operate according to the principle of a jet pump, whereby the pressure energy of a gas that is used as a pumping medium is converted in a pumping nozzle into kinetic energy. A suction medium is suctioned off and accelerated by the gas jet that exits from the pumping nozzle. In the intake cone of the diffuser that is connected to the pumping nozzle, pumping and suction media are mixed and are in turn slowed down in the diffuser, whereby pressure energy is recovered.

The use of the method according to the invention is not limited by the type of physical gas scrubbing. It can be used with special advantage, however, when in the physical gas scrubbing, methanol is used as a scrubbing agent with a physical action. The two carbon dioxide product streams typically accumulate in this connection at pressures of 2.3 and 1.3 bar(a). By the use of the gas jet ventilator, a pressure increase of approximately 0.5 bar is possible, so that a merged carbon dioxide stream that has a pressure of approximately 1.8 bar is produced. In comparison to the state of the art, the volume stream that is to be after-treated is therefore reduced by approximately 25%.

In general, the higher pressure carbon dioxide is produced at a pressure between 2 and 5 bar (absolute) and the lower pressure carbon dioxide generally at a pressure between 1.0 and 1.5 bar (absolute). The pressure increase of the lower pressure carbon dioxide product stream depends on the ratio of these two pressure levels and is typically in the range of 0.4 to 2 bar.

The after-treatment step is primarily necessary to reduce the concentration of scrubbing agent, which goes into the carbon dioxide product stream during the physical gas scrubbing, to below a specified boundary value. If the scrubbing agent having a physical action, such as, for example, methanol, is water-soluble, the after-treatment step usually comprises a water scrubbing, in which the scrubbing agent that has a physical action is scrubbed out with demineralized water. Preferably, the water scrubbing is performed in a scrubbing column, by which the carbon dioxide that is to be scrubbed is run in countercurrent to the scrubbing water. An after-treatment step in which the undesired components are removed from the carbon dioxide stream by attachment to a solid (adsorption) or, for example, by a chemical reaction in liquids, solids, or in the gas phase (e.g., combustion) is also conceivable, however. Also, for this method, the reduced volume stream as well as the elevated pressure level are advantageous.

In addition, the invention relates to an apparatus for separating a carbon dioxide-containing gas mixture comprising a system for performing physical gas scrubbing, in which carbon dioxide is separated from the carbon dioxide-containing gas mixture and can be converted into two product streams that contain primarily carbon dioxide and have different pressures, as well as a system for performing an after-treatment step, in which, in the event of an operational breakdown, after their pressures are balanced, the two carbon dioxide product streams can be subjected to an after-treatment.

On the apparatus side, the objects are achieved according to the invention by an apparatus that comprises a gas jet ventilator for balancing the pressures of the two carbon dioxide product streams, by which the carbon dioxide product stream that has the lower pressure can be compressed, whereby the carbon dioxide product stream that has the higher pressure can be used as a pumping medium.

The system for performing a physical gas scrubbing is preferably a methanol scrubbing, in which methanol can be used as a scrubbing agent with a physical action. Systems can also be used, however, in which substances other than scrubbing agents can be used.

First of all, the after-treatment step uses the reduction of concentrations of scrubbing agents that have a physical action in the carbon dioxide product streams. Since such scrubbing agents are often water-soluble, it is proposed that the system for performing an after-treatment step comprise a waster scrubbing system. Preferably, the water scrubbing system is embodied as a scrubbing column, through which the carbon dioxide to be scrubbed can be sent in countercurrent to the demineralized water. It is also possible, however, that undesirable components can be removed from the carbon dioxide stream in the system for performing an after-treatment step by attachment to a solid (adsorption) or, for example, by a chemical reaction in liquids, solids, or in the gas phase (e.g., combustion).

Thanks to the invention, it is not only possible to reduce the investment costs in comparison to the state of the art, since the system for performing an after-treatment step can be produced at lower cost. Rather, it also makes it possible to lower the expense for the necessary operating agents and thus the operating costs. If the after-treatment step comprises, for example, a water scrubbing, the latter can be performed with a smaller amount of scrubbing water than according to the state of the art. Moreover, the regeneration of the charged scrubbing water is less expensive.

BRIEF DESCRIPTION OF THE DRAWINGS

The invention is illustrated schematically with reference to an exemplary embodiment in the drawing and will be described extensively hereinafter with reference to the drawing. Various other features and attendant advantages of the present invention will be more fully appreciated as the same becomes better understood when considered in conjunction with the accompanying drawing wherein: FIG. 1 diagrammatically illustrates an embodiment according to the invention.

The embodiment relates to a methanol scrubbing, in which two carbon dioxide product streams are produced at different pressure levels, which are compressed in normal operation in a multi-stage compressor and are fed to, for example, a sequestration.

A carbon-dioxide-containing gas mixture is introduced via line 1 into the physical gas scrubber or washer W1 and is separated there into a product gas stream 2 as well as a first carbon dioxide product stream 3 and a second carbon dioxide product stream 4, whereby the first carbon dioxide product stream 3 has a lower pressure level than the second 4. In normal operation, the two carbon dioxide product streams 3 and 4 are sent to the compressor V that has several compressor sections, where they are compressed and are merged to form a carbon dioxide stream 5. In this connection, the first carbon dioxide product stream 3 is fed to the compressor V on its induction side, while the second carbon dioxide product stream 4 can be released to it on a higher pressure-line. The carbon dioxide stream 5 is removed below by sequestration (not shown).

Depending on the method, the two carbon dioxide product streams 3 and 4 have residual contents of methanol, which specifically allow their sequestration but not their direct release into the atmosphere. If, for example, because of an operational breakdown, such as, e.g., if the compressor V fails, sequestration cannot take place, it is therefore not allowed to discharge the carbon dioxide streams into the atmosphere without an after-treatment step, in which their methanol contents are dropped to below an admissible boundary value. In such a case, the second carbon dioxide product stream 4 is introduced into the gas jet ventilator G as a pumping medium 6 and is first accelerated there, whereby its pressure drops to below the pressure level of the first carbon dioxide product stream 3, by which the latter is suctioned off via line 7 into the gas jet ventilator G. At a pressure that lies between the pressure levels of the two carbon dioxide product streams 3 and 4, a merged carbon dioxide stream 8 leaves the gas jet ventilator G and is introduced into the water scrubbing W2 that is embodied preferably as a column. Via line 9, demineralized water is fed as scrubbing water in an amount that is sufficient to drop the methanol content in the carbon dioxide to below the boundary value applicable for introduction into the atmosphere. The carbon dioxide stream that is removed via line 10 from the water scrubber or washer W2 can therefore be run into the chimney K for disposal and can be discharged into the atmosphere.

The entire disclosure[s] of all applications, patents and publications, cited herein and of corresponding German Application No. 10 200 050 435.1, filed Nov. 4, 2010 are incorporated by reference herein.

The preceding examples can be repeated with similar success by substituting the generically or specifically described reactants and/or operating conditions of this invention for those used in the preceding examples.

The invention claimed is:

1. A method for separation of a gas mixture (1) that contains carbon dioxide, said method comprising: separating carbon dioxide from a carbon dioxide-containing gas mixture (1) by physical gas scrubbing (W1) to produce two product streams (3, 4) that contain primarily carbon dioxide and have different pressures, and in an event of an operational breakdown, the pressures of the two carbon dioxide product streams are balanced, and said carbon dioxide product streams are subjected to an after-treatment step (W2) and then released into the atmosphere, wherein to balance the pressures of the two carbon dioxide product streams (3, 4), the lower pressure carbon dioxide product stream (3, 7) is compressed by means of a gas jet ventilator (G), and the higher pressure carbon dioxide product stream (4) is used as a pumping medium (6) in the gas jet ventilator (G).

2. The method according to claim 1, wherein methanol is used as a scrubbing agent in the physical gas scrubbing (W1).

3. The method according to claim 1, wherein said after-treatment step comprises a water scrubbing (W2), in which a scrubbing agent that has a physical action is scrubbed out with demineralized water (9).

4. The method according to claim 2, wherein said after-treatment step comprises a water scrubbing (W2), in methanol is scrubbed out with demineralized water (9).

5. The method according to claim 3, wherein the water scrubbing (W2) is performed in a scrubbing column in which carbon dioxide (8) that is to be scrubbed is run in countercurrent to the scrubbing water (9).

6. The method according to claim 4, wherein the water scrubbing (W2) is performed in a scrubbing column in which carbon dioxide (8) that is to be scrubbed is run in countercurrent to the scrubbing water (9).

7. An apparatus for separating a carbon dioxide-containing gas mixture (1) comprising: a physical gas scrubbing stage (W1) for separating carbon dioxide from a carbon-dioxide-containing gas mixture (1) and for producing two carbon dioxide product streams (3, 4) that contain primarily of carbon dioxide wherein the product streams have different pressures, and an after-treatment stage (W2), in which, in an event of an operational breakdown, the pressures of the two carbon dioxide product streams are balanced, the two carbon dioxide product streams (3, 4) can be subjected to an after-treatment, said after-treatment stage (W2) comprising a gas jet ventilator (G) for balancing the pressures of the two carbon dioxide product streams (3, 4) wherein the lower pressure carbon dioxide product stream (3, 7) is compressed, and the higher pressure carbon dioxide product stream (4) is used as a pumping medium (6).

8. The apparatus according to claim 7, wherein the physical gas scrubbing stage (W1) has an inlet for introducing methanol to act as a scrubbing agent.

9. The apparatus according to claim 7, wherein the after-treatment stage comprises a water scrubbing stage (W2).

10. The apparatus according to claim 8, wherein the after-treatment stage comprises a water scrubbing stage W2).

11. The apparatus according to claim 9, wherein a water scrubbing stage (W2) is a washing scrubbing wherein carbon dioxide (8) to be scrubbed can be run in countercurrent to a demineralized water (9).

12. The apparatus according to claim 10, wherein a water scrubbing stage (W2) is a scrubbing column wherein carbon dioxide (8) to be scrubbed can be run in countercurrent to a demineralized water (9).

13. An apparatus for separating a carbon dioxide-containing gas mixture (1) comprising: a physical gas scrubbing stage (W1) for separating carbon dioxide from a carbon dioxide-containing gas mixture (1), said physical gas scrubbing stage having an inlet for introducing a carbon dioxide-containing gas mixture (1), a first outlet for discharging a first lower pressure carbon dioxide product stream, and an second outlet for discharging a second higher pressure carbon dioxide product stream, and an after-treatment stage (W2), in which, in an event of an operational breakdown, the pressures of the two carbon dioxide product streams are balanced, and the two carbon dioxide product streams (3, 4) can be subjected to an after-treatment, said after-treatment stage (W2) comprising a gas jet ventilator (G) for balancing the pressures of the two carbon dioxide product streams (3, 4), said a gas jet ventilator (G) having a first inlet for introducing the lower pressure carbon dioxide product stream (3, 7) as a stream to be compressed, and a second inlet for introducing the higher pressure carbon dioxide product stream (4) as a pumping medium (6) to produce a balanced pressure carbon dioxide product stream, and said after-treatment stage (W2) comprising a water scrubbing column for scrubbing carbon dioxide (8), said water scrubbing column having a first inlet for introducing the balanced pressure carbon dioxide product stream from the gas jet ventilator (G) and a second inlet for introducing demineralized water (9) to scrub the balanced pressure carbon dioxide product stream, wherein said first and second inlets are positioned so that the balanced pressure carbon dioxide product stream and demineralized water flow in countercurrent within said water scrubbing column.

14. The method according to claim 1, wherein, before passage through said gas jet ventilator (G), said higher pressure carbon dioxide product stream (4) has a pressure between 2 and 5 bar and said lower pressure carbon dioxide product stream (3) has a pressure between 1.0 and 1.5 bar.

15. The method according to claim 1, wherein, as a result of passage through said gas jet ventilator (G), the pressure of said lower pressure carbon dioxide product stream is increased by 0.4 to 2 bar.

16. The method according to claim 1, wherein said after-treatment step comprises removal of undesired components in a solid adsorption process.

17. The method according to claim 1, wherein said after-treatment step comprises removal of undesired components in a combustion process.

* * * * *